J. G. VINCENT.
HYDROCARBON MOTOR.
APPLICATION FILED JAN. 24, 1916.

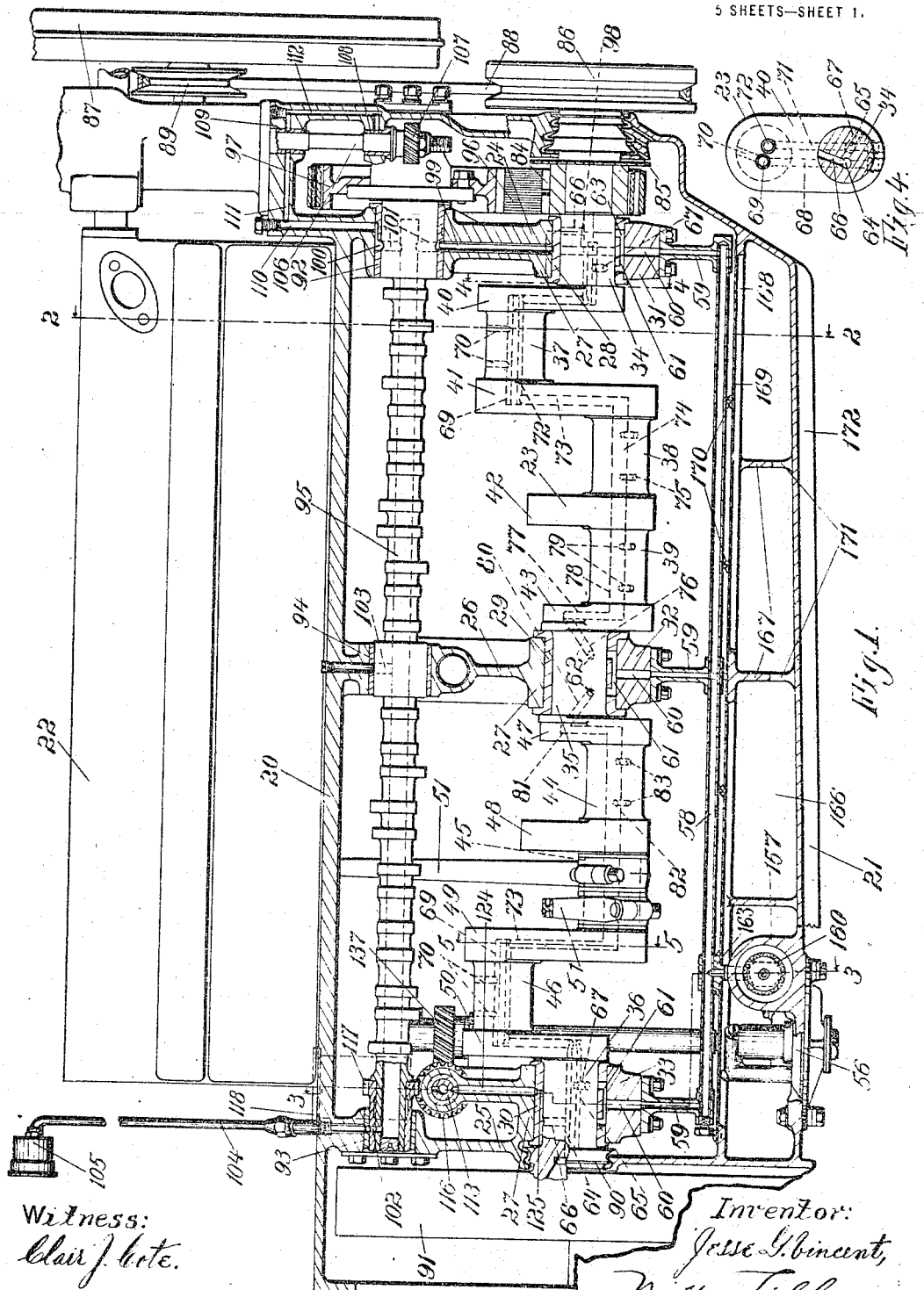

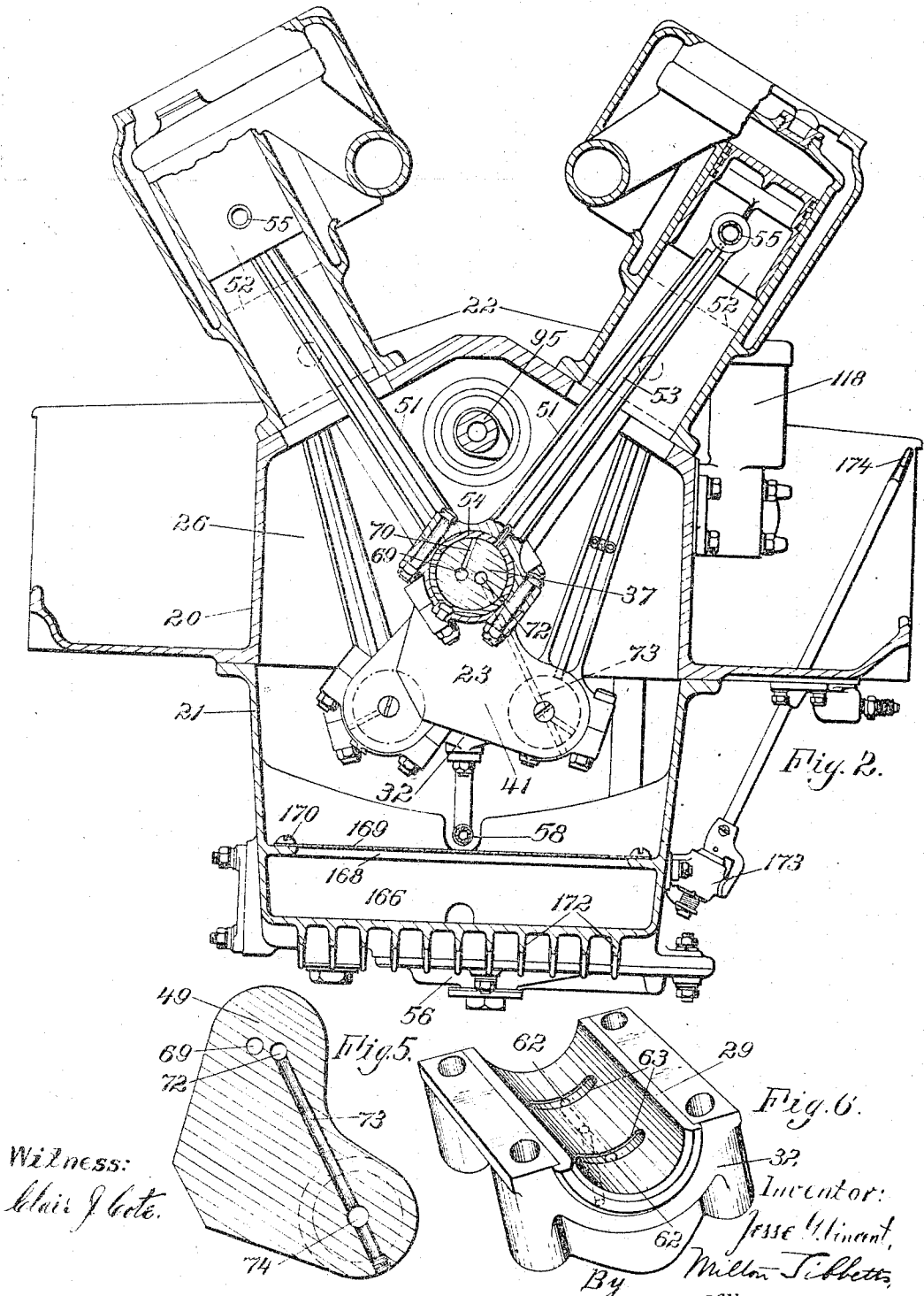

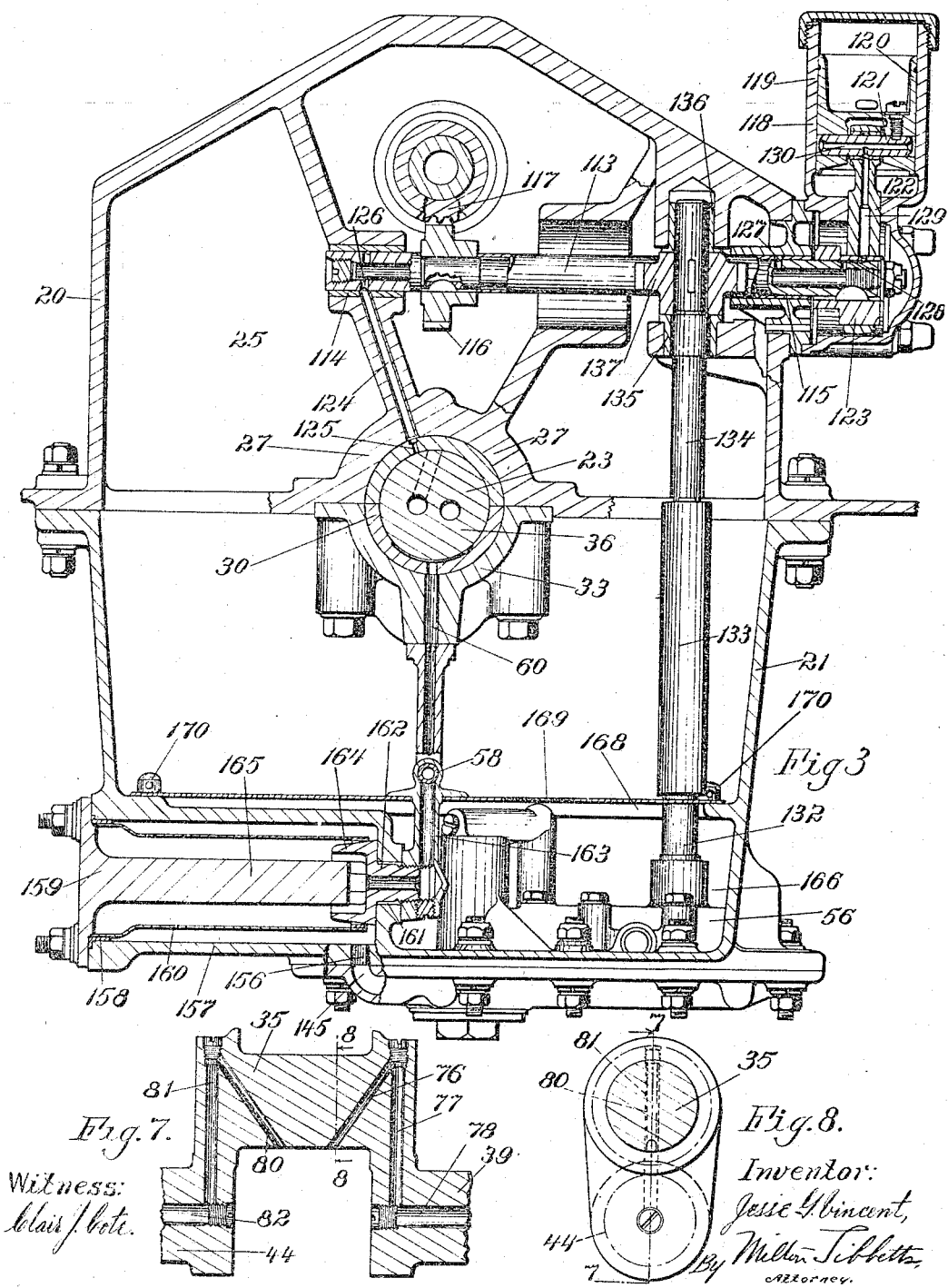

1,288,302.

Patented Dec. 17, 1918.
5 SHEETS—SHEET 4.

Witness:
Clair J. Cote.

Inventor.
Jesse G. Vincent,
By Melton Tibbitts,
Attorney.

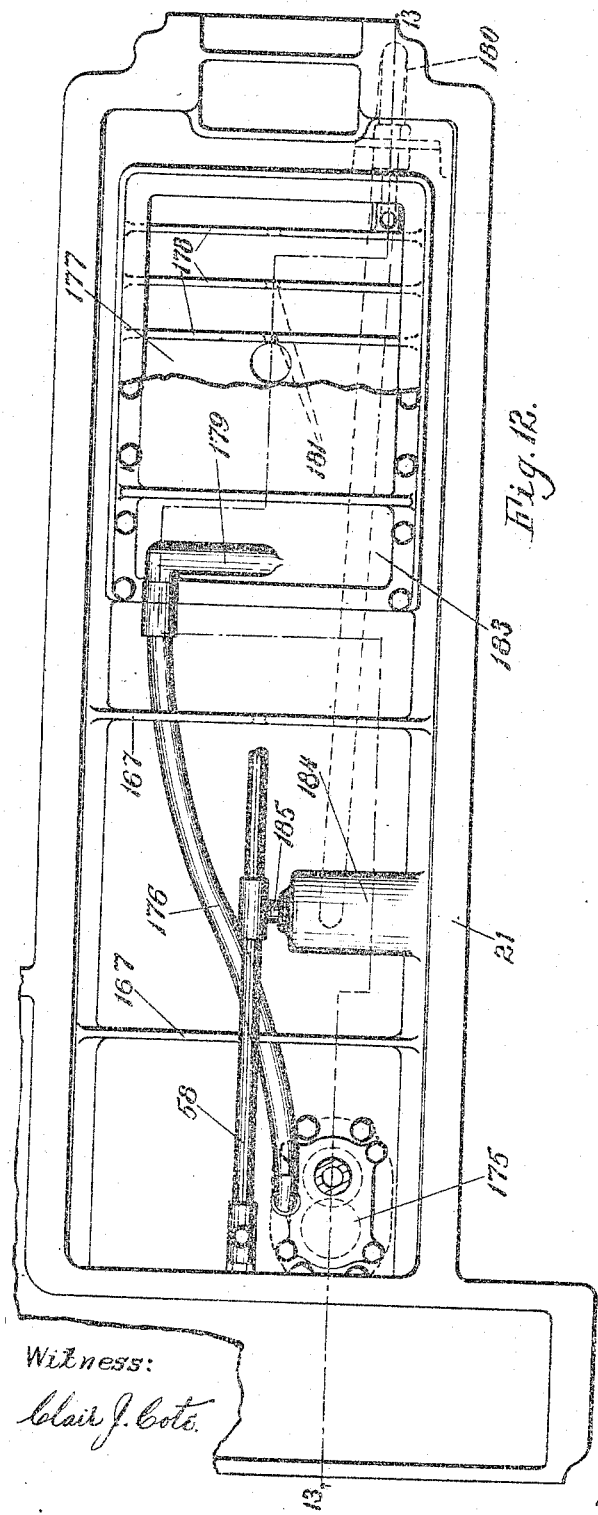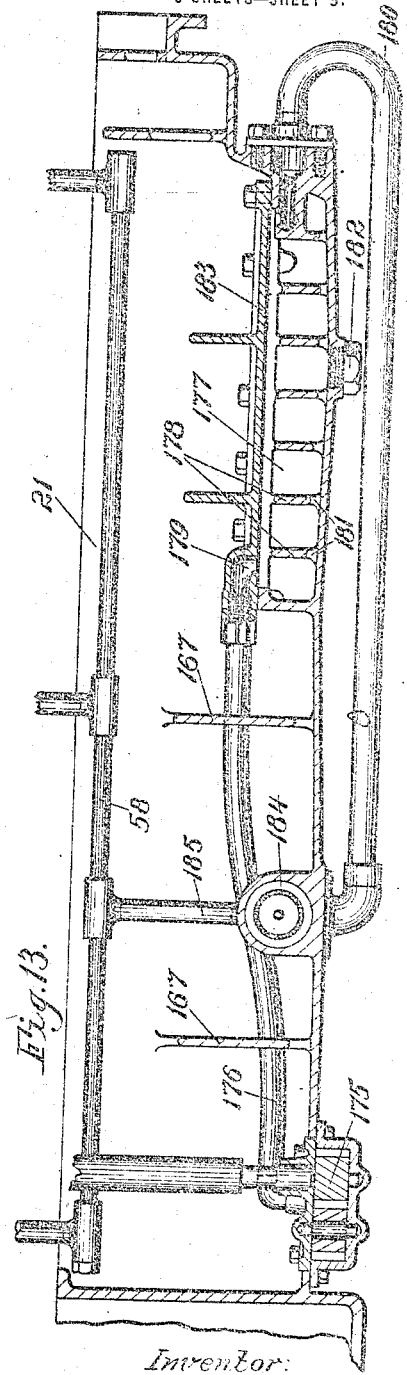

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,288,302.   Specification of Letters Patent.   Patented Dec. 17, 1918.

Application filed January 24, 1916. Serial No. 73,967.

*To all whom it may concern:*

Be it known that I, JESSE G. VINCENT, a citizen of the United States, and resident of Detroit, Wayne county, State of Michigan, have invented certain new and useful Improvements in Hydrocarbon-Motors, of which the following is a specification.

This invention relates to hydrocarbon motors and particularly to oiling systems therefor.

The salient object of the invention is to produce an oiling system that will provide ample lubrication to substantially all of the moving or wearing parts of a hydrocarbon motor. This and the other objects and the advantages that flow from the invention, will be seen from the following description taken with the drawings which form a part of this application, and in which:

Figure 1 is a vertical longitudinal section through a hydrocarbon motor embodying this invention;

Fig. 2 is a vertical transverse section substantially on the line 2—2 of Fig. 1;

Fig. 3 is an enlarged transverse vertical section substantially on the line 3—3 of Fig. 1;

Fig. 4 is a section through the front main bearing of the crank shaft, substantially on the line 4—4 of Fig. 1;

Fig. 5 is an enlarged transverse section through one of the cheeks of the crank shaft, on the line 5—5 of Fig. 1;

Fig. 6 is a perspective view of one of the bearing caps with the lower half of the bearing therein;

Fig. 7 is an enlarged longitudinal sectional view of the middle part of the crank shaft, on the line 7—7 of Fig. 8;

Fig. 8 is a transverse section through the crank shaft part shown in Fig. 7 on the line 8—8 of that figure;

Fig. 12 is a plan view of another form of the crank case in which a settling basin is embodied; and Fig. 13 is a vertical section on the line 13—13 of Fig. 12.

Figure 9:
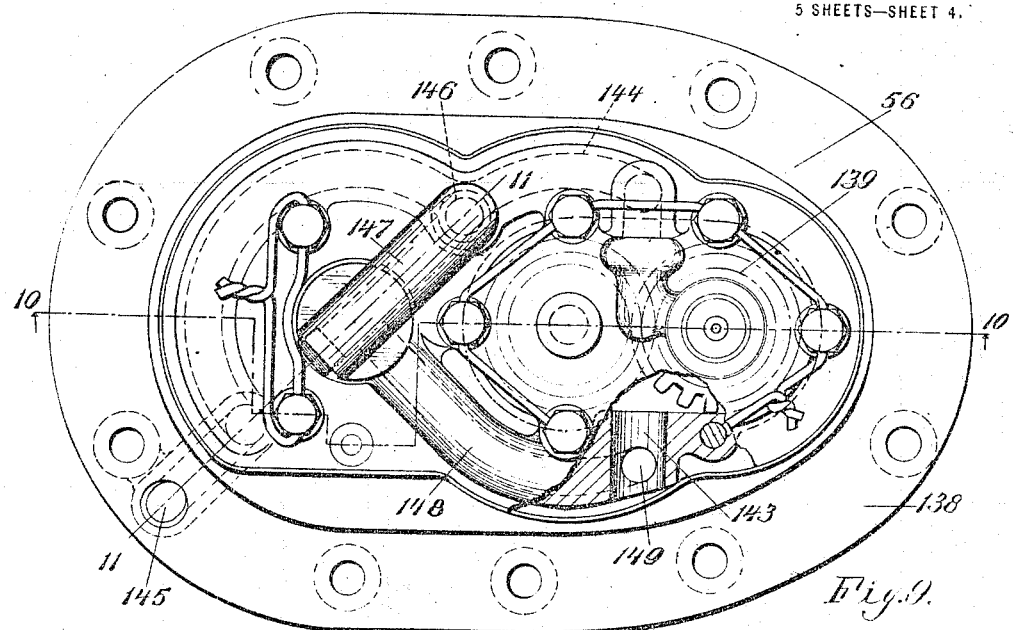
Fig. 9 is an enlarged plan view of the oil pump with parts cut away.

Referring to the drawings, the motor base or crank case comprises upper and lower halves 20 and 21 respectively, the upper half forming a support for the cylinders 22, which are shown as formed in two blocks arranged in V-relation. The crank case as a whole forms a housing for the crank shaft 23 and the other moving parts of the motor, and the lower half 21 forms an oil well which collects and holds the oil used in the lubrication system.

As shown, the upper half 20 of the crank case is formed with a front partition or wall 24, a rear partition or wall 25, and an intermediate partition or wall 26. Each of these partitions or walls is formed with a bearing receiving part or support 27 in which the three bearings 28, 29 and 30 are held as by caps 31, 32 and 33, respectively. One of these caps, which may be the cap 32, is shown in enlarged perspective in Fig. 6, with the lower half of the bearing 29 therein. These bearings 28, 29 and 30 are the main bearings of the crank case, and the crank shaft 23 is supported in them. They are of course held in rigid alinement.

The crank shaft 23 comprises main bearing parts 34, 35 and 36, which are mounted to rotate in the bearings above described, and there are several bearing parts between each of the end bearings and the intermediate bearing 29. As shown, there are three bearing parts in the form of crank pins 37, 38 and 39, between the front bearing part 34 and the intermediate bearing part 35 of the crank shaft, and these crank pins are connected by cheeks 40, 41, 42 and 43, with each other and with the front bearing part and intermediate bearing part of the crank shaft. The rear half of the crank shaft is substantially symmetrical with the front half, there being three crank pins 44, 45 and 46, and four cheeks 47, 48, 49 and 50.

It will be understood that more or less cylinders may be used with a crank shaft of the above described construction, but as shown, there are six cylinders in each of the two blocks, thus providing two connecting rods for attachment to each of the crank pins of the crank shaft. These connecting rods are shown particularly in Fig. 2, being indicated at 51, as connecting the crank pins with the various pistons 52 in the cylinders 22. It will be seen also that each of the connecting rods 51 is provided with an oil tube or conduit 53, which is adapted to convey oil under pressure from the bearing 54 of the connecting rod which surrounds the respective crank pin, to the piston pin 55, as will be more particularly hereinafter described. The bearings 54 of the connecting rods are mounted side by side on the crank pins as shown particularly in Fig. 1.

Means are provided for feeding oil under pressure to the three main bearings of the crank case. As shown, this means comprises a pump 56 which delivers oil (the pump and connections will be more particularly described hereinafter) to an oil manifold 58 which extends lengthwise of the crank case beneath the main bearings. There are three branches 59 from this manifold 58, which are connected to the caps 31, 32 and 33, respectively, whereby the entire manifold is supported by the caps. Each of the caps is formed with a passage 60, and a branched passage 61 is formed between the cap and the lower half of the bearing which it supports, this passage 61 being preferably cut in the bearing metal, so that the oil is led to two separated points 62 in each bearing.

By referring to Figs. 3 and 6, it will be seen also that channels 63 are cut circumferentially in each of the main bearings, whereby oil may be fed some distance around the bearings. For a purpose which will be hereinafter described, these channels 63 are cut substantially 120 degrees of the full circumference of the bearings.

It will be understood that oil under pressure fed through the manifold 58 will reach the three main bearings of the crank case through the branches 59, the passages 60 and 61 and the channels 63, where the oil will of course spread on the bearing surface, some of it leaking through and returning to the oil well below.

Means are also provided for conveying oil to the various crank pins of the crank shaft, and as shown, this means is in the form of independent conduits leading to each of the crank pin bearing parts. In other words, means have been described above for feeding oil under pressure to a main bearing part of the crank shaft, and this invention contemplates means for leading oil from said main bearing part of the crank shaft independently to two other bearing parts thereof. Thus, oil is led from one of the channels 63 of one of the end main bearings to the adjacent crank pin bearing part, and independent means are provided for leading oil from the other channel 63 of said main bearing to the crank pin bearing part beyond said adjacent crank pin bearing part.

In the form shown, the end main bearings supply oil to the four crank pins closest to them, and the intermediate main bearing supplies oil to the crank pins on each side of it.

For the purpose of making the drawing clearer, the various channels formed in the crank shaft have their useful parts only indicated, but the method of forming these channels by drilling and plugging is illustrated, for instance, in Figs. 5, 7 and 8. It would be confusing to show all of the threaded parts and plugs in Figs. 1 and 2, for instance.

The front end bearing part 34 of the crank shaft has two longitudinal channels 64 and 65, the former having a radial branch 66 and the latter a similar radial branch 67. As will be seen particularly in Fig. 1, the branch 66 registers with the front channel 63 in the main bearing 28, and the branch 67 registers with the rear channel 63 of said bearing. As shown in Figs. 1 and 4, the passage 64 communicates with a passage 68 in the cheek 40, and the latter passage communicates with a longitudinal passage 69 in the crank pin 37, and from the passage 69 there are two separated branches 70 leading to the surface of the crank pin. Thus it will be seen that there is a direct oil passage from the forward channel 63 of the front end main bearing 28, to two points on the surface of the crank pin bearing part 37 of the crank shaft. It will also be seen that the branches 70 are in parallel, and as the connecting rods 51 on each crank pin are always at an angle to each other, as shown particularly in Fig. 2, these branches 70 will communicate with the pipes 53 of said connecting rods at different times, whereby the oil will be more readily conveyed through said pipes 53 to the piston pins 55. Also the outlet branches 70 are each smaller than the inlet branch 66 whereby pressure is better maintained in the conduit. This is true of all of the other crank pins, as will hereinafter more fully appear.

Again referring to Figs. 1 and 4, it will be seen that there is a passage 71 in the cheek 40, which communicates with the passage 65 as well as with a passage 72, which extends through the crank pin 37 in parallel, but not in communication, with the passage 69 therein. Said passage 72 leads to a passage 73 in the cheek 41, which communicates with a longitudinal passage 74, through the crank pin 38. A pair of parallel branches 75 similar to the branches 70 lead oil from the passage 74 to the surface of the crank pin 38 and to the pipes 53 of the connecting rods which are connected to that crank pin. Thus, there is an independent oil lead from the rear channel 63 of the front end main bearing 28 of the crank case to two points on the surface of the crank pin 38. Moreover, it will be seen, upon reference to said Figs. 1 and 4, that the branches 66 and 67 are arranged at substantially 120 degrees apart, and since the channels 63 extend about the same number of degrees around the bearing, it will be evident that the branches 66 and 67 will receive oil during only about one third of the revolution of the crank shaft, and at different times during each revolution. Also, there will be a period of about 120 degrees during which neither of the branches will receive oil.

It will be understood that the rear part of the crank shaft is exactly the same as the front part so far as these oil passages are concerned, the rear main bearing 30 supplying oil independently to the crank pins 45 and 46, just as the front bearing 28 supplies oil to the crank pins 37 and 38. Hence, the various channels in the parts of the crank shaft numbered 45, 49, 46, 50, and 36, will be given the same numbers as those at the front end of the crank shaft, so far as they are shown. In this connection, Fig. 5 will assist in illustrating the construction. It will be seen also that the branches 66 and 67 at the rear end of the crank shaft are arranged the same as at the front end, so that one of these branches at the rear end will receive oil simultaneously with one of the branches at the front end, but there will still be substantially 120 degrees of revolution of the crank shaft during which none of the four branches is receiving oil. The reason for this will appear shortly.

The intermediate bearing part 35 of the crank shaft has a diagonal passage 76, extending from the forward channel 63 in the main bearing 29, into the cheek 43 where it communicates with a passage 77 in said cheek, which passage leads to a longitudinal passage 78 in the crank pin 39. Here there are two branches 79 which lead to the surface of the crank pin 39, as with the crank pins heretofore described. The main bearing part 35 also has a diagonal passage 80 which leads from the rear channel 63 of the intermediate main bearing 29 into a passage 81 in the cheek 47. The passage 81 communicates with a longitudinal passage 82 in the crank pin 44, where there are two branches 83 as in the other crank pins. Thus there is an independent conduit for the oil from the main bearing 29 to each of the crank pins 39 and 44, and it will be noted that the diagonal passages 76 and 80 are in the same plane longitudinally of the crank shaft so that they register simultaneously with their respective channels 63. However, these diagonal passages are set at substantially 120 degrees from each of the passages 66 and 67 in the front and rear main bearing parts of the crank shaft, whereby they will register with their respective channels 63 while the said passages 66 and 67 are out of register with their respective channels. Thus, there are six openings which register at various times with the six channels 63 in the three main bearings, and it may be said that these six openings are spaced in pairs approximately 120 degrees apart around the bearings, whereby two of them only are being fed from the manifold 58 at one time. This tends to maintain the highest efficiency of the pressure oiling system. Obviously, these openings are in register with their respective channels at the same time that the branches in the crank pins with which they communicate are in register with their respective tubes 53 in the connecting rods 51.

The front end of the crank shaft 23 extends forwardly beyond the main bearing 28 and is provided with a main driving gear or sprocket 84. It is also provided with a series of throw-off flanges 85 where it passes through the front end of the crank case, and upon its outer end is a driving pulley 86 which drives the fan 87 through a belt 88 and pulley 89. Upon the rear end of the crank shaft are throw-off flanges 90 also, and a fly-wheel 91 serves to steady the rotation of the shaft.

Also mounted in the walls 24, 25 and 26, above the crank shaft 23, are bearings 92, 93 and 94, respectively, which support a cam shaft 95, which is drilled out as shown to provide an oil passage therethrough. The cam shaft is driven at its front end from the crank shaft 23 through a chain 96, and sprocket 97.

Means are provided for supplying oil under pressure to the various bearings of the cam shaft from one of the main bearings of the crank shaft. Thus the main bearing 28 has an outside circumferential passage 98 which communicates with the passage 60 in the cap 31, and with a passage 99 formed vertically in the wall 24. The latter passage communicates with the bearing 92, which has a groove 100 encircling it for constant communication with branch passages 101, which communicate with the interior of the cam shaft 95. Thus oil is supplied to the bearing 92 and to the cam shaft, from which it is supplied to the bearings 93 and 94 through branches 102 and 103 respectively. A pipe 104 leads from the bearing 93 where it is in communication with the branch passage 102, to a gage 105, which may be suitably located for the operator. Thus the pressure in the system is indicated at the point most remote from the source of pressure. If the pressure is high enough at this point, it is evident that it will be sufficient at all other points in the system.

Located just forward of the front end of the cam shaft is a vertical shaft 106 arranged to operate the timer of the ignition system. This shaft 106 is driven from the cam shaft 95 by means of a pair of spiral gears 107 and it is mounted in a pair of separated bearings 108 and 109. These bearings are supplied with oil under pressure from the bearing 92 through passages 110, 111 and 112. The oil leaking from ing 108 will of course amply supply the gears 107.

Shown as arranged at the rear end of the crank shaft over the main bearing 30, is a cross shaft 113, supported in bearings 114 and 115, the latter being removable and sufficiently large to permit the passage of the gear 116 as the shaft, the bearing, and the gear are withdrawn from the crank case as a unit. The gear 116 is keyed to the shaft 113, and is driven by a similar spiral gear 117 on the cam shaft 95. The bearing piece 115, which may be removably secured to the crank case, has mounted upon it a small air pump 118, as shown particularly in Fig. 3. This pump is preferably used to supply air pressure to the gasolene system which supplies the motor with fuel, and it comprises a cylinder 119, a piston 120, piston pin 121, connecting rod 122, and eccentric or crank 123, mounted on the end of the shaft 113. The shaft 113 is shown as of tubular form, and it is supplied with oil under pressure by a passage 124, leading from a channel 125, formed in the outer circumference of the main bearing 30, which passage connects with the passage 60 in the cap 33. Branches 126 convey the oil from the passage 124 to the interior of the shaft 113, and to the bearing 114, and branches 127 pass the oil to the bearing 115. Other passages 128, 129, and 130, carry the oil to the connecting rod bearings of the pump 118 and to the piston pin 121. Thus it will be seen that the shaft 113 and all of the moving parts of the pump 118 are lubricated directly from the main bearing 30 of the crank shaft.

Mounted in the bottom of the crank case is an oil pump designated generally as 56 and it is provided with a driving shaft in three sections, 132, 133 and 134. The section 132 is rigidly connected to one of the gears of the pump, the section 134 is mounted in separated bearings 135 and 136 in the upper part of the crank case, and the part or section 133 has a loose squared connection with the other two sections, which permits the various sections to be readily detached axially. The pump shaft is driven from the shaft 113 through a pair of spiral gears 137.

Figure 10:
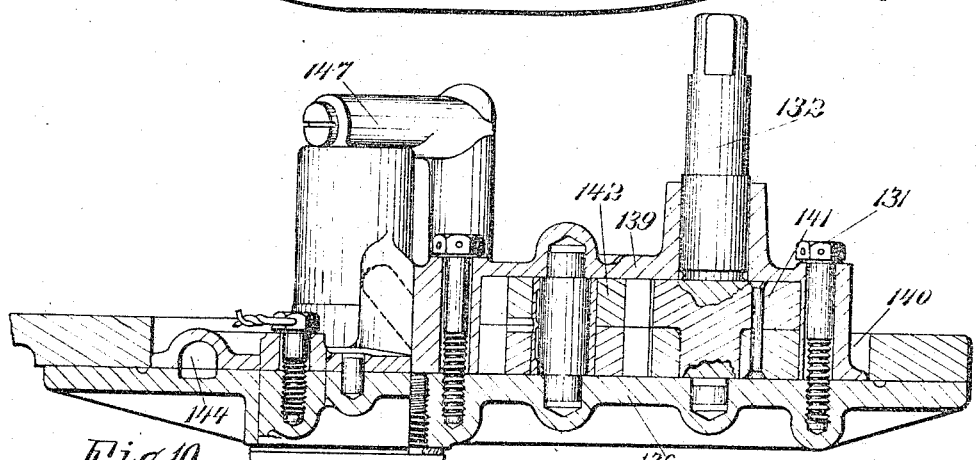
Fig. 10 is a vertical sectional view through the pump shown in Fig. 9, being taken on the line 10—10 of that figure.
Figure 11:
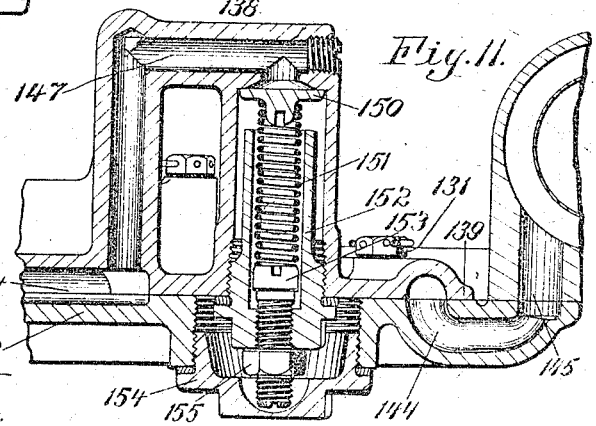
Fig. 11 is a vertical section substantially on the line 11—11 of Fig. 9.

The pump 56 hereinabove referred to is illustrated in detail in Figs. 9, 10 and 11. The casing of the pump is in two parts 138 and 139 connected by bolts 131, and it is in the form of a cover which closes a bottom opening 140 in the crank case lower half. The pump proper is of the ordinary spur gear type, the gears being shown at 141 and 142, the driving shaft section 132 being formed as a part of the former gear. The inlet passage 143 of the pump is shown particularly in Fig. 9 and the outlet passage 144 is shown in dotted lines as circling around the side of the casing and terminating at 145. From a point 146 in this outlet passage 144, a branch pipe 147 of inverted U form leads to a bypass 148 which terminates at 149 in the inlet passage 143, as shown particularly in Fig. 9. In one of the vertical arms of the passage 147 is mounted an adjustable relief valve 150, which is held to its seat by a spring 151 in a removable tubular support 152. A bolt 153 forms an abutment for the lower end of the spring 151, and is threaded in the support 152. A removable cap 154 covers the outer end of the bolt 153, and a jam nut 155 forms a lock for the bolt. It will be understood that the tension of the spring 151 may be altered by removing the cap 154, loosening the jam nut 155, and turning the bolt 153. The entire valve and its adjusting mechanism may be removed by withdrawing the threaded support 152. By providing the bypass 148 which returns all excess oil directly to the intake passage 143, unnecessary stirring up of the oil in the bottom of the crank case is obviated.

As shown particularly in Fig. 3, oil from the outlet 145 of the pump passes through a port 156 into a cylindrical part 157 formed in the crank case lower half. This cylindrical part is formed with an open end 158 which is provided with a removable cover 159, to which a cylindrical screen 160 is secured. At the inner end of the part 157, there is an opening 161 through which passes a connecting piece 162, which threads into a pipe coupling 163, and secures the latter rigidly to the inner end of the cylindrical part 157. The pipe coupling 163 is connected to the oil manifold 58 hereinabove referred to. The inner end of the connecting piece 162 is beveled as at 164, to provide a seat for the inner open end of the cylindrical strainer 160. It is also of angular form interiorly to receive the angular end of a spider 165 which extends from the cap 159 into the connecting piece 162 to lock the latter in place.

The entire lower portion of the crank case is in the form of an elongated reservoir 166, with a series of baffle plates 167 extending across it to prevent surging of the oil. The upper part of the reservoir is surrounded by a flange 168, to which a screen 169 is secured as by a series of screws 170. This screen or strainer extends over the entire reservoir, so that all of the oil which falls from the various rotating parts in the crank case above it must pass through this screen to reach the reservoir and the pump, the latter being mounted preferably in the lowest part of the reservoir. Small openings 171 are provided in each of the baffles 167, to permit the oil to flow to the lowest part of the reservoir. Thus it will be seen that oil is strained by the strainer 169 before it reaches the pump, and it is then passed through the strainer 160 under pressure on its way to the manifold 58.

Cooling ribs 172 may cast on the outside of the bottom of the crank case to reduce the temperature of the oil, and a petcock 173 operated by a handle 174 may be provided for the purpose of determining the proper level for the oil in the crank case.

Figs. 12 and 13 illustrate a modified form of crank case in which a settling basin is employed instead of the screened reservoir shown in the other figures. It is obvious that the screened reservoir may also be used in conjunction with the settling basin shown in said Figs. 12 and 13, if desired.

This settling basin is for the purpose of separating the water from the oil, water always being present to a greater or lesser extent in the oil used in hydrocarbon motors.

A conventional form of pump is shown at 175, and the outlet therefrom communicates through a pipe 176 with a chamber 177 formed in the forward part of the crank case. This chamber 177 is of tightly closed construction, and is provided with a series of cross partitions 178, forming several compartments which communicate with each other across the tops of the partitions which do not quite reach to the top of the chamber. The oil is fed to the chamber as at 179 into one end compartment, and passes over the tops of the various partitions 178, until it reaches the compartment at the other end of the chamber, where it is led away by a pipe 180. Thus the water may separate from the oil in the various compartments, and settle at the bottoms of them, small openings 181 being provided at the bottoms of each of the partitions to permit draining of each of them by removing the plug 182 in the bottom of the lowest compartment. The chamber is accessible for cleaning by removing the cover 183. The pipe 180 leads to a suitable strainer 184, from which it is conveyed to the oil manifold 58 through a pipe 185.

Other forms and modifications of the invention may be used without departing from the spirit or scope of the invention, the forms herein shown being illustrative only, and not intended to limit this specification.

Having thus described my invention, what I claim and desire to secure by Letters Patent is:—

1. In a hydrocarbon motor, in combination, a crank case, a crank shaft mounted in bearings therein, a screen extending entirely across the crank case beneath the travel of the crank shaft, a pump in the crank case below the screen, a second screen, a conduit from the pump to said second screen and a conduit from the second screen to said bearings.

2. A crank shaft having a main bearing part and a plurality of crank pins, there being a cheek connecting said main bearing part with an adjacent crank pin and a second cheek connecting said adjacent pin with a second crank pin, and said crank shaft having independent conduits leading, first, from the main bearing part to the adjacent crank pin, and second, from the main bearing part to the second crank pin.

3. A crank shaft having a main bearing part and a plurality of crank pins, there being a cheek connecting said main bearing part with an adjacent crank pin and a second cheek connecting said adjacent pin with a second crank pin, and said crank shaft being drilled to provide one conduit from the main bearing part through the first cheek to the adjacent crank pin and a second conduit from the main bearing part through both cheeks and the adjacent crank pin to the second crank pin, said conduits being independent of each other.

4. A crank shaft having three spaced main bearing parts and three crank pins between each of the end bearing parts and the intermediate bearing part, and cheeks connecting said parts and pins, said crank shaft having independent conduits leading from the main bearing parts to each of the crank pins.

5. A crank shaft having three spaced main bearing parts and three crank pins between each of the end bearing parts and the intermediate bearing part, and cheeks connecting said parts and pins, said crank shaft having conduits leading from the intermediate bearing part to the next adjacent crank pins on each side and from the end bearing parts to the other crank pins.

6. In a hydrocarbon motor, in combination, a crank case, cylinders thereon, a crank shaft mounted in the crank case and having a crank pin for each pair of cylinders, pistons in the cylinders, and connecting rods between the pistons and crank pins, there being two connecting rods on each crank pin and each connecting rod having a conduit for leading oil to the piston, said crank shaft having two oil passages in each crank pin adapted to register with said conduits.

7. In a hydrocarbon motor, in combination, a crank case, cylinders thereon, a crank shaft mounted in the crank case and having a crank pin for each pair of cylinders, pistons in the cylinders, and connecting rods between the pistons and crank pins, there being two connecting rods on each crank pin and each connecting rod having a conduit for leading oil to the piston, said crank shaft having two oil passages in each crank pin adapted to register at different times with the conduits of the connecting rods thereon.

8. In a hydrocarbon motor, in combination, a crank case having bearings therein, a crank shaft having bearing parts in said bearings and having crank pin bearing parts, means for feeding oil to one of said bearings and to the crank shaft bearing part therein, means for leading oil from the latter said crank shaft bearing part to the adjacent crank pin bearing part, and means for independently leading oil from the latter said crank shaft bearing part to the crank pin bearing part beyond said adjacent crank pin bearing part.

9. In a hydrocarbon motor, in combination, a crank case having bearings, a crank shaft mounted in said bearings, means for feeding oil to one of said bearings, and said crank shaft having a conduit leading from said bearing to one of its crank pins, said conduit being smaller adjacent its outlet than it is adjacent its inlet.

10. In a hydrocarbon motor, in combination, a crank case having bearings, a crank shaft mounted in said bearings, and having crank pins, a plurality of connecting rods journaled on one of the crank pins of the crank shaft angularly relative to each other, said connecting rods having oil receiving passages, means for feeding oil to one of said bearings, and said crank shaft having a conduit leading from said bearing to said crank pin, said conduit having a branch outlet for each of said connecting rods.

11. In a hydrocarbon motor, in combination, a crank case having bearings, a crank shaft mounted in said bearings, a plurality of connecting rods journaled on one of the crank pins of the crank shaft angularly relative to each other, said connecting rods having oil receiving passages, means for feeding oil to one of said bearings, and said crank shaft having a conduit leading from said bearing to said crank pin, said conduit having a branch outlet for each of said connecting rods, each of which branch outlets is smaller than the inlet of said conduit.

12. In a hydrocarbon motor, in combination, a crank case having end bearings and an intermediate bearing, a crank shaft mounted in said bearings and having three crank pins between each end bearing and the intermediate bearing, means for delivering oil to each of said bearings, and means formed in the crank shaft for conveying oil from said bearings to each of said crank pins independently.

13. In a hydrocarbon motor, in combination, a crank case having three main bearings, a crank shaft mounted in said bearings and having three crank pins between each of the end bearings and the intermediate bearing, means for feeding oil to said bearings, means for leading oil from the intermediate bearing to the nearest crank pin on each side thereof, and means for leading oil from the end bearings to the other four crank pins.

14. In a hydrocarbon motor, in combination, a crank case having three main bearings, a crank shaft mounted in said bearings and having three crank pins between each of the end bearings and the intermediate bearing, means for feeding oil to said bearings, means for leading oil from the intermediate bearing to the nearest crank pin on each side thereof, and means for leading oil from the end bearings independently to each of the other four crank pins.

15. In a hydrocarbon motor, in combination, a crank case, having three main bearings, a crank shaft mounted in said bearings and having three crank pins between each of the end bearings and the intermediate bearing, means for feeding oil to said bearings and means for leading oil from said bearings independently to each of the crank pins.

16. In a hydrocarbon motor, in combination, a crank case having three main bearings, a crank shaft mounted in said bearings and having three crank pins between each of the end bearings and the intermediate bearing, means for feeding oil to said bearings, and means for leading oil from the main bearings to two points on each of the crank pins of the crank shaft.

17. In a hydrocarbon motor, in combination, a crank case having three main bearings, a crank shaft mounted in said bearings and having three crank pins between each of the end bearings and the intermediate bearing, and means for feeding oil through the crank shaft to two points on each of the crank pins thereof.

18. In a hydrocarbon motor, in combination, a crank case having a bearing receiving part, a metal bearing therein, means securing the bearing in place, and a crank shaft in said bearing, said metal bearing having two oil feeding conduits and said crank shaft having two registering conduits.

19. In a hydrocarbon motor, in combination, a crank case having a bearing receiving part, a metal bearing therein, a cap for securing the bearing in place, said cap having a single oil receiving opening, and said bearing having two oil feeding openings supplied from said cap, and a crank shaft in said bearing and having two oil conduits adapted to register respectively with the openings in said bearing.

20. In a hydrocarbon motor, in combination, a crank case having a bearing receiving part, a metal bearing therein, a cap for securing the bearing in place, said cap having a single oil receiving opening and said bearing having two oil feeding openings supplied from said cap, and a crank shaft in said bearing and having two oil conduits adapted to register respectively and at different times with the openings in said bearing.

21. In a hydrocarbon motor, in combination, a crank case having bearings therein, a crank shaft having several bearing parts mounted in said bearings, and means for feeding oil at two separated points to one of said bearings, said crank shaft having means for leading oil from said points independently to two other bearing parts of the crank shaft.

22. In a hydrocarbon motor, in combination, a crank case having three main bearings therein, a crank shaft having three bearing parts mounted respectively in said bearings and each of said bearing parts having two oil inlet openings, the six said openings being spaced in pairs approximately 120 degrees apart around the bearings, and means for feeding oil to said openings.

23. In a hydrocarbon motor, in combination, a crank case having three main bearings therein, a crank shaft having three bearing parts mounted respectively in said bearings and each of said bearing parts having two oil inlet openings, said crank shaft having three crank pins between each end bearing and the intermediate bearing and having independent oil conduits from the six openings to the six crank pins, and means for feeding oil to said openings.

24. In a hydrocarbon motor, in combination, a crank case having three main bearings therein, a crank shaft having three bearing parts mounted respectively in said bearings and each of said bearing parts having two oil inlet openings, said crank shaft having three crank pins between each end bearing and the intermediate bearing and having independent oil conduits from the six openings to the six crank pins, the six said openings being spaced in pairs approximately 120 degrees apart around the bearings, and means for feeding oil to said openings.

25. In a hydrocarbon motor, in combination, a crank case having three main bearings therein, a crank shaft having three bearing parts mounted respectively in said bearings and each of said bearing parts having two oil inlet openings, said crank shaft having three crank pins between each end bearing and the intermediate bearing, and having six independent oil conduits from the six openings to the six crank pins respectively, the six said openings being spaced in pairs approximately 120 degrees apart around the bearings, and means for feeding oil to each pair of openings in succession for approximately 120 degrees of rotation of the crank shaft.

26. In a hydrocarbon motor, in combination, a crank case having three main bearings therein, a crank shaft having three bearing parts mounted respectively in said bearings and each of said bearing parts having two oil inlet openings, the six said openings being spaced in pairs approximately 120 degrees apart around the bearings, and means for feeding oil to each pair of openings in succession for approximately 120 degrees of rotation of the crank shaft.

27. In a hydrocarbon motor, in combination, a crank case having three main bearings therein, a crank shaft having three bearing parts mounted respectively in said bearings, said crank shaft having three crank pins between each end bearing and the intermediate bearing and having means for leading oil from each main bearing independently to two crank pins, and means for feeding oil to the respective oil leading means of the main bearings during part only of each revolution of the crank shaft, whereby said crank pins receive oil in pairs in succession, each pair during approximately 120 degrees of rotation of the crank shaft.

28. In a hydrocarbon motor, in combination, a crank case having main and cam shaft bearings, a crank shaft mounted in the main bearings, a hollow cam shaft in the other bearings, means for feeding oil under pressure to the crank shaft bearings, means for leading oil from one of the crank shaft bearings to the interior of the cam shaft at the front end, and a gage in communication with the interior of the cam shaft at the rear end.

29. In a hydrocarbon motor, in combination, a crank case having bearings therein and comprising an oil receiving reservoir beneath the bearings, an oil screen extending substantially the length and breadth of the reservoir and over the top thereof whereby all oil passing into the reservoir passes through said screen, a crank shaft mounted in said bearings, a pump in said reservoir, an oil strainer on the pressure side of the pump, and means for feeding the oil from said strainer to said bearings.

30. In a hydrocarbon motor, in combination, a crank case having main bearings, crank shaft mounted therein, a vertical timer shaft mounted in the crank case and driven from the crank shaft, and means for feeding oil to the main bearings and from there to the bearings of the timer shaft.

31. In a hydrocarbon motor, in combination, a crank case, a crank shaft, a cam shaft, and a vertical timer shaft, all mounted in bearings in the crank case, and means for feeding oil under pressure to all of said bearings.

32. In a hydrocarbon motor, in combination, a crank case, a crank shaft, a cam shaft, and a vertical timer shaft, all mounted in bearings in the crank case, and means for feeding oil under pressure to the crank shaft bearings then to the cam shaft bearings, and from the latter bearings to the bearings of the vertical shaft.

33. In a hydrocarbon motor, in combination, a crank case, a longitudinal shaft mounted therein, a cross shaft, a pump driven directly by the cross shaft, an oil pump in the bottom of the crank case, and a vertical shaft for driving the oil pump and driven by the cross shaft.

34. In a hydrocarbon motor, in combination, a crank case, a longitudinal shaft mounted therein, a cross shaft, and two pumps driven by said cross shaft.

35. In a hydrocarbon motor, in combination, a crank case, having main bearings, a crank shaft mounted therein, a cam shaft mounted in the crank case and driven by the crank shaft, a cross shaft mounted in bearings in the crank case and driven from the cam shaft, means for feeding oil to the crank shaft bearings, and means leading oil from a crank shaft bearing to the bearings of the cross shaft.

36. In a hydrocarbon motor, in combination, a crank case, having main bearings, a crank shaft mounted therein, a cam shaft mounted in the crank case and driven by the crank shaft, a cross shaft mounted in bearings in the crank case and driven from the cam shaft, a pump driven by said cross shaft, and means for feeding oil to all of said bearings and to said pump.

37. In a hydrocarbon motor, in combination, a crank case having main bearings, a crank shaft mounted therein, a cam shaft mounted in the crank case and driven by the crank shaft, a cross shaft mounted in bearings in the crank case and driven from the cam shaft, a pump driven by said cross shaft, means for feeding oil to said main bearings, and means for leading oil from a main bearing to the cross shaft bearings and said pump.

38. In a hydrocarbon motor, in combination, a crank case having a cylindrical oil strainer part, having an outlet at one end and an opening at the other end, a removable cap for said opening having a strainer with an open end, a boss at the outlet end of the cylindrical part surrounded by said cap and closing the open end of said strainer, and means for passing oil through the strainer.

39. In a hydrocarbon motor, in combination, a crank case having a cylindrical oil strainer part, and an opening in the bottom adjacent the oil strainer part, a detachable strainer connected to said strainer part, and a detachable pump connected to the crank case to cover said opening and having a delivery connection with said strainer part.

40. In a hydrocarbon motor, in combination, a casing having an open end, a removable cap for said end, a cylindrical strainer secured to said cap, a connecting piece at the inner end of the casing adapted to be threaded into a pipe connection, and a piece on said cap extending to said connecting piece for locking the latter.

41. In a hydrocarbon motor, in combination, a casing having an open end, a removable cap for said end, a cylindrical strainer secured to said cap, a connecting piece at the inner end of the casing adapted to be threaded into a pipe connection, said connecting piece closing the inner end of said strainer, and a piece on said cap extending to said connecting piece for locking the latter.

42. In a hydrocarbon motor, in combination, a crank case having an elongated closed chamber therein, means for feeding oil under pressure to one end of said chamber, and means for leading oil away from the other end of the chamber.

43. In a hydrocarbon motor, in combination, a crank case having an elongated closed chamber therein, means for feeding oil under pressure to one end of said chamber, and means for leading oil away from the other end of the chamber at a high level therein.

44. In a hydrocarbon motor, in combination, a crank case having a closed chamber, a series of partitions therein dividing the chamber into compartments communicating along the tops of the partitions, means for feeding oil under pressure at one end of said chamber, and said chamber having an outlet at the other end.

45. In a hydrocarbon motor, in combination, a crank case having a closed chamber, a series of partitions therein extending from the base to approximately the top of the chamber thus dividing the chamber into compartments communicating along the tops of the partitions, said chamber having an inlet at one end and an outlet at the other end.

46. In a hydrocarbon motor, in combination, a crank case having a closed chamber, a series of partitions therein dividing the chamber into compartments communicating along the tops of the partitions, said chamber having an inlet into one of said compartments and an outlet from a compartment at the opposite end of the chamber.

47. An oil pump comprising a casing having a pump chamber, gears therein forming a pump, said casing having an inlet passage, an outlet passage and an arched conduit leading from the outlet to the inlet passage, a vertically arranged valve in said conduit, a threaded adjusting member for said valve, and a cap over said member.

In testimony whereof I affix my signature.

JESSE G. VINCENT.